United States Patent [19]
Bradshaw et al.

[11] Patent Number: 5,835,722
[45] Date of Patent: Nov. 10, 1998

[54] SYSTEM TO CONTROL CONTENT AND PROHIBIT CERTAIN INTERACTIVE ATTEMPTS BY A PERSON USING A PERSONAL COMPUTER

[75] Inventors: Michael S. Bradshaw, Anaheim; George Y. Shih, Vorba Linda, both of Calif.

[73] Assignee: Logon Data Corporation, Orange, Calif.

[21] Appl. No.: 672,105

[22] Filed: Jun. 27, 1996

[51] Int. Cl.[6] ................................................ G06F 17/30
[52] U.S. Cl. .................. 395/200.55; 395/200.47; 395/187.01
[58] Field of Search ............... 395/186, 187.01, 395/188.01, 200.11, 200.06, 200.09, 200.47, 200.33, 200.54, 200.55, 673; 707/9, 10, 202; 380/25

[56] References Cited

U.S. PATENT DOCUMENTS

| 5,173,940 | 12/1992 | Lantz et al. | 380/25 |
| 5,355,414 | 10/1994 | Hale et al. | 380/25 |
| 5,359,660 | 10/1994 | Clark et al. | 380/25 |
| 5,377,354 | 12/1994 | Scannell et al. | 395/673 |
| 5,619,648 | 4/1997 | Canale et al. | 395/200.01 |
| 5,706,507 | 1/1998 | Schloss | 707/9 |

OTHER PUBLICATIONS

Reichard, Kevin, Three Cybersmut Censors Try to Clean Up the Internet, p. 46, Nov. 7, 1995.

LaPlante, Alice, Net Cops, Abstract, Mar. 11, 1996.

Howlett, Dennis, Screening Your E–Mail Contents, p. 58, Sep. 6, 1995.

Atwood, Gretchen, Going Beyond Blocking, p. 3, Apr. 8, 1996.

"Safe Computing" in *Internet World*, Sep. 1996, pp. 49–58.

*Primary Examiner*—Richard L. Ellis
*Assistant Examiner*—Patrice L. Winder
*Attorney, Agent, or Firm*—Knobbe, Martens, Olson & Bear, LLP

[57] ABSTRACT

A computer terminal and a method for blocking the use and transmission of vulgar and pornographic material in a responsive and interactive manner that comprehensively monitors computer operations for creation or transmission of vulgar and pornographic material. Data created by the keyboard, data passing through the clipboard, data selected by the mouse pointer, and data passing through the Internet interface are monitored for content and further operation of the computer terminal is blocked. The computer terminal may only be unblocked by a supervisory intervention, such as by entering of a password, or by restarting or resetting the terminal. Key word searches, such as those in Internet search engines, are also monitored, but the terminal adapts to monitor not only for words of a profane and vulgar nature, but also for words that are behaviorally tested to produce lists containing vulgar and profane items, e.g., Internet sites. The computer terminal and method can be modified to block other forms of communication or computer operation, such as blocking transmission of secret business data, blocking execution or opening of certain programs or files, and the like.

55 Claims, 7 Drawing Sheets

SYSTEM TO CONTROL CONTENT AND PROHIBIT CERTAIN INTERACTIVE ATTEMPTS BY A PERSON USING A PERSONAL COMPUTER

FIELD OF THE INVENTION

The present invention involves a system that blocks certain undesirable and unsupervised activities of computer use, particularly for Internet access.

BACKGROUND OF THE INVENTION

The rapid rise in the popularity of the use of the Internet and its transformation from a mainly military and academic service to a service for the ordinary consumer has led to a rise in the use of the Internet to transmit pornographic and obscene materials.

This has been a particular problem for schools and families with children. Unless strictly and constantly supervised, a child or adolescent with basic Internet skills can access materials that are inappropriate for their viewing.

DESCRIPTION OF THE PRIOR ART

In response to the need for some control over Internet access by children, there have been several software products which have been simplistic attempts to block certain activity. The attempt has usually been based upon central themes, i.e. blocking all files with a suffix denoting a graphic content (.BMP, .TIF, .JPG, .GIF, and etc.). One popular software product on the market uses such a scheme, the thought being that blocking all graphics will block the child from seeing pornographic materials. However, the problem is that a child in school is unable to see any graphics pertaining to anything (including safe subjects), which severely limits use of the Internet as a learning and research tool. In addition, textual material that is seen or generated by a child can be just as pornographic and harmful to the child as a picture. The elimination of graphic files is adequate to accomplish the main purpose of a blocking program, that of screening vulgar and pornographic materials. Because this scheme is so simplistic, it blocks much more legitimate material than pornographic material and does not block pornographic material effectively.

Another simplistic approach used in the commercial product, Surfwatch™, is to prevent access to sites listed in a library of prohibited sites. However, with the rapid expansion of pornographic sites, this scheme can only control access to a fraction of the accessible pornographic sites. The library is encrypted and permits no deletion or addition of sites. A subscription to regularly updated libraries is provided, but the software provider cannot know all of the sites, and in fact a study of the library for Surfwatch™ has shown that essentially only half of the known sites are included in the library. This is not unexpected, as discovering all of the sites that exist is not a simple task. The absence of certain pornographic sites would not be a serious problem if a parent, teacher, or supervisor could add sites personally as they become known, but this is not allowed by the program.

Another problem with systems that block access to Internet sites is that they also block the use of search engines. Search engines are becoming more common on the Internet and include Internet indexes such as Lycos, Web Crawler, Yahoo, and indexes at the Internet sites of universities and libraries. In a search engine one can devise a key word search that produces a list of Internet sites which contain the most explicit sexual material. This search can be conducted by using key words that ordinarily are not pornographic or vulgar. The use can then click on the name of the site with the mouse pointer without having to type in the name of the site. In response to this problem, the prior-art blocking systems have included the addresses of the major Internet search engines, indexes, and universities in the list of prohibited Internet sites. This presents a serious problem for schools. The students are denied one of the most powerful and useful features of the Internet; being able to research topics using the search engines. If the Internet is to be used as a serious learning and research tool, the search engines must be made available to the student. An indiscriminate blocking of search engines may prohibit key word searches for pornographic sites, however, this indiscriminate blocking is performed at a very high cost and severely compromises the value of Internet access.

Another problem with systems that screen Internet sites is that they are designed to work and operate only with certain Internet access applications, particularly NetScape™. Their compatibility is limited to systems that monitor the transmission control protocol/Internet protocol ("TCP/IP") routines (winsock in Windows). Thus, pornographic material can be produced in, sent to, and received from Internet access applications that do not use winsock, e.g., America-On-Line™, bulletin-board systems, or systems that are not compatible. There is no screening of applications used to produce vulgar text, which can be used to produce inappropriate E-mail messages. There is no blocking of the running of inappropriate game applications that are pornographic, violent, or time wasting, and no screening for inappropriate E-mail, either transmitted or received.

Basically, prior art systems suffer from several significant problems, (1) they do not screen out significant pornographic activity while they block very useful and valuable activities, (2) their selection criteria are too simplistic to screen even a fraction of pornographic material that a child could access and does not comprehend the complexity of the computer and the different forms in which pornographic material may be received, (3) they are not interactive, i.e., there is no means to add or delete sites from the library of prohibited sites, and (4) there is no control what-so-ever over textual content of material being received, transmitted, or produced, whether it be by E-mail or other textual materials.

BRIEF SUMMARY AND OBJECTS OF THE INVENTION

Summary of the Invention

In brief summary, the present invention overcomes or substantially alleviates the aforesaid problems of prior-art systems. Rather than a simplistic software approach, such as taken by prior systems, the present invention takes a comprehensive approach that contemplates the computer hardware and its interaction with software, the different means of communication of the computer system, and also allows interaction and control by a supervising adult over what is screened. In addition, provision is made to screen content of materials being produced and exclusion of materials is not based merely on their Internet source.

The comprehensive approach of the present invention not only blocks access to certain sites but also blocks the production of documents, E-mail, etc. with certain vulgar and offensive words, blocks the running of certain programs, blocks E-mail to certain addresses, and screens alternate methods of sending or generating text, e.g., using the mouse, keyboard, and clipboard.

In addition, the present invention allows the use of search engines. The comprehensive approach allows screening of the key word searches. The content search is at a different level in search engines than for other content searches, the use of words inappropriate for a key word search are screened out along with offensive words. Thus, proper use of search engines for research and harmless entertainment is still possible, while improper use is essentially eliminated, or at least severely restricted.

The present invention includes a blocking system that applies to a specific Internet winsock application on the computer, as with prior-art systems, but also functions with all applications in the system. It is automatically loaded as a TSR program when the computer is first turned on and monitors in the background various input and output channels of the computer. Key strokes from the keyboard, data passing through the Internet transmission control protocol/Internet protocol ("TCP/IP") driver, data passing to and from the system clipboard, and mouse pointer inputs are monitored. This essentially provides monitoring of essentially all that is needed for user input into any application. Command strings under icons are monitored when clicked by the mouse pointer, thus the transfer to a different Internet site or execution of a program can be blocked. In addition, E-mail can be controlled by prohibiting E-mail to certain addresses, and enabling a supervisory adult to monitor incoming and outgoing E-mail. E-mail is logged into a file, which is accessible by password, to allow the supervisor to review in-coming and out-going E-mail.

The libraries of prohibited words and Internet addresses can be edited by a supervisor, allowing addition and deletion of selected words and sites. The libraries can only be added or modified with the password, thus maintaining the security of the system. Any attempt to disable the system of the invention can cause damage or alteration to Windows initialization (*.ini) files. These files must then be restored. In a preferred embodiment, the invention includes software that creates a backup disk of critical Windows initialization files, or other critical files, which can be used to restore the files to their original condition. The present invention responds to experimental tampering, file deletion, and .dll file deletion by disabling the Windows platform. In prior art systems, while disabling routines may be provided, there is nothing for restoration and recovery of lost and damaged files. Prior art systems require a full reloading of all affected software, or other drastic file and program recovery measures.

Another feature of the invention is an automated system for sending messages to selected E-mail addresses. When an undesirable E-mail address is discovered, in addition to adding it to the library to block transmission to that address, a message indicating that they have been blocked or opining on the offensive nature of their E-mail can be sent.

The monitoring and blocking features of the present invention are applicable to situations beyond just pornography and foul language filtering. This is possible, due to the interactive nature of the system which allows modification of the libraries and the disabling of the system by a supervisory person. For example, it can be used by a business to prevent transmission or copying of confidential files or the playing of unauthorized game programs. Since the invention interacts with the system and any application on the system, it can be used on-line, off-line, and in intra-office network communications to prevent obscene or other undesirable words from being produced in any application, preventing the use of obscenity in interoffice mail and correspondence. It can block the unauthorized running of any program or access to any file, prevent unauthorized use of "game" programs in home and business settings, and block access to or transmission of critical or secret information. In addition, the unauthorized transmission of personal phone numbers, credit card numbers, and the like, can be blocked.

The comprehensive approach of the present invention also creates redundancies or multiple layers through which an activity must pass. Since the present invention operates at the basic interaction levels between software and hardware and contains redundancies, the system is less likely to pass an inappropriate text creation or transmission. In addition, it also provides opportunities for a supervisor to intervene and provide corrective action. Therefore, it is much more difficult to bypass the system and it is less likely that offensive material will inadvertently get through. Thus, for example, if a key word search inadvertently produces a pornographic site in its list, it can be blocked as a prohibited Internet site. If offensive material is sent or received via E-mail, the parent can review the E-mail activity, block transmissions to the offensive site, and send mail requesting that no more transmissions be sent. Since the keyboard, the mouse, and clipboard are screened, not only for prohibited Internet sites but also for offensive words and prohibited E-mail sites, the content of messages as well as their destination can be blocked. The screening for text content occurs in any application running under the system, e.g., word processor, text editor, non-winsock communications program, etc.

Objects of the Invention

Accordingly, an object of the invention is a system to filter production and transmission of foul and obscene language at any computer site.

Another object of the invention is to provide a means to block access to any Internet site, particularly those containing indecent or pornographic material.

Another object of the invention is to block entry by any input means of prohibited words, program names, Internet addresses, file names, and the like, into any computer application which may be running on a computer.

Another object of the invention is to provide a pornography foul word filter that works with any Internet access application, as well as off-line applications.

Another object of the invention is to provide a system that is comprehensive which does not substantially block unoffensive and useful activity.

Another object of the invention is to provide a pornography filter that is not easily disabled or circumvented by someone not authorized to do so.

Another object of the invention is to ease the supervision of Internet access and pornography filtering by providing an editable library of prohibited words and sites and provide a means for review of past E-mail which has been received and transmitted.

DETAILED DESCRIPTION OF THE ILLUSTRATED EMBODIMENTS

Figure 1:
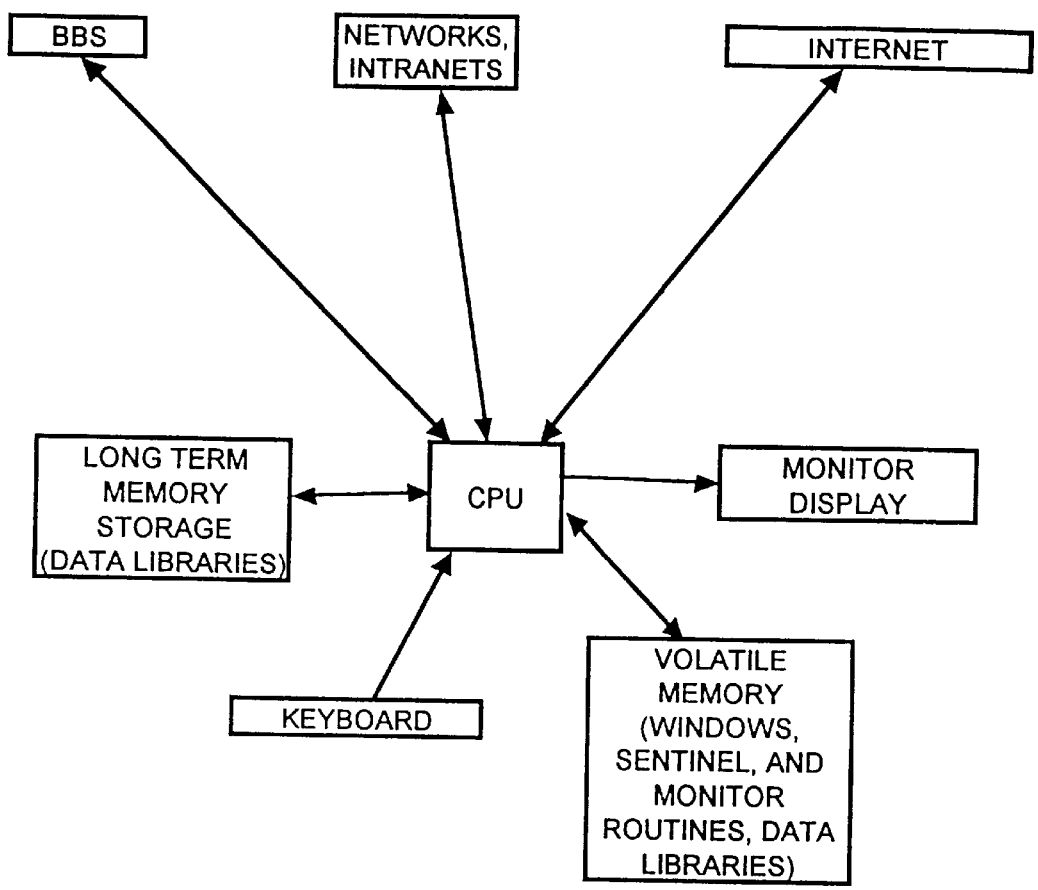
FIG. 1 is a block diagram of a terminal system of the invention.

Reference is made to FIG. 1, which is a block diagram of the hardware, software, and other features and components of the invention. A computer terminal comprises a CPU. The CPU communicates with volatile memory, e.g., RAM, which during operation of the terminal contains software for the system, e.g., Windows, and the monitoring and sentinel routines more fully described below. The interface with the user is provided by a monitor display and data is entered by a user by means of a keyboard and a mouse that controls a pointer on the monitor display. Library files, programs, and document files accessible by the CPU are stored on a long term memory storage device, usually a hard drive. A memory referred to as a clipboard is used for transferring information within or between software applications. Electronic communication via the Internet is provided through appropriate communication ports to the CPU. The invention involves an interaction between each of these subsystems in a way that modifies the manner in which a computer terminal functions. Particularly with respect to Internet communications, the display upon the monitor, data flows from the keyboard and mouse, and data flows in and out of the clipboard.

In the following description, the software aspects of the invention may be referred to as X-Stop, XStop, or the like, as a shorthand for a preferred embodiment of the present invention. X-Stop is a trademark belonging to the Log-On Data Corp. or Anaheim, Calif., although the "™" symbol is omitted herein for convenience. The "user" may be a child, student, or company employee. The "supervisor" may be a parent, teacher, or company supervisor, i.e., anyone who has authority to control the user of the computer system in which X-Stop is installed. The invention is a computer terminal that involves X-Stop installed in an appropriate computer system. The system may be a stand alone PC, PC on a network, or PC that can be connected to the Internet. X-Stop monitors and will intercept any prohibited creation, transmission, input or output of data through the hardware channels on the system. While this description refers mainly to X-Stop installed in a Windows system, it is within the skill of a practitioner in the art to develop a system according to the invention for any of the various Windows systems, e.g., Windows 3.1, Windows NT, Windows 95, or any other system that is "multitasking," allowing programs to remain active in the background while another application is running as the topmost application. This includes any of the Macintosh™ operating systems, OS/2™, Unix™ systems, and the like.

In the description below, a fictional word, "mukky" is used to illustrate any prohibited word, such as profanity, a racial epithet, hate speech, or any other word that the supervisor wishes to block. Prohibited Internet sites are illustrated by the fictional site, "http://www.mukky.com," and prohibited e-mail addresses by "slime@mukky.com".

Figure 2:
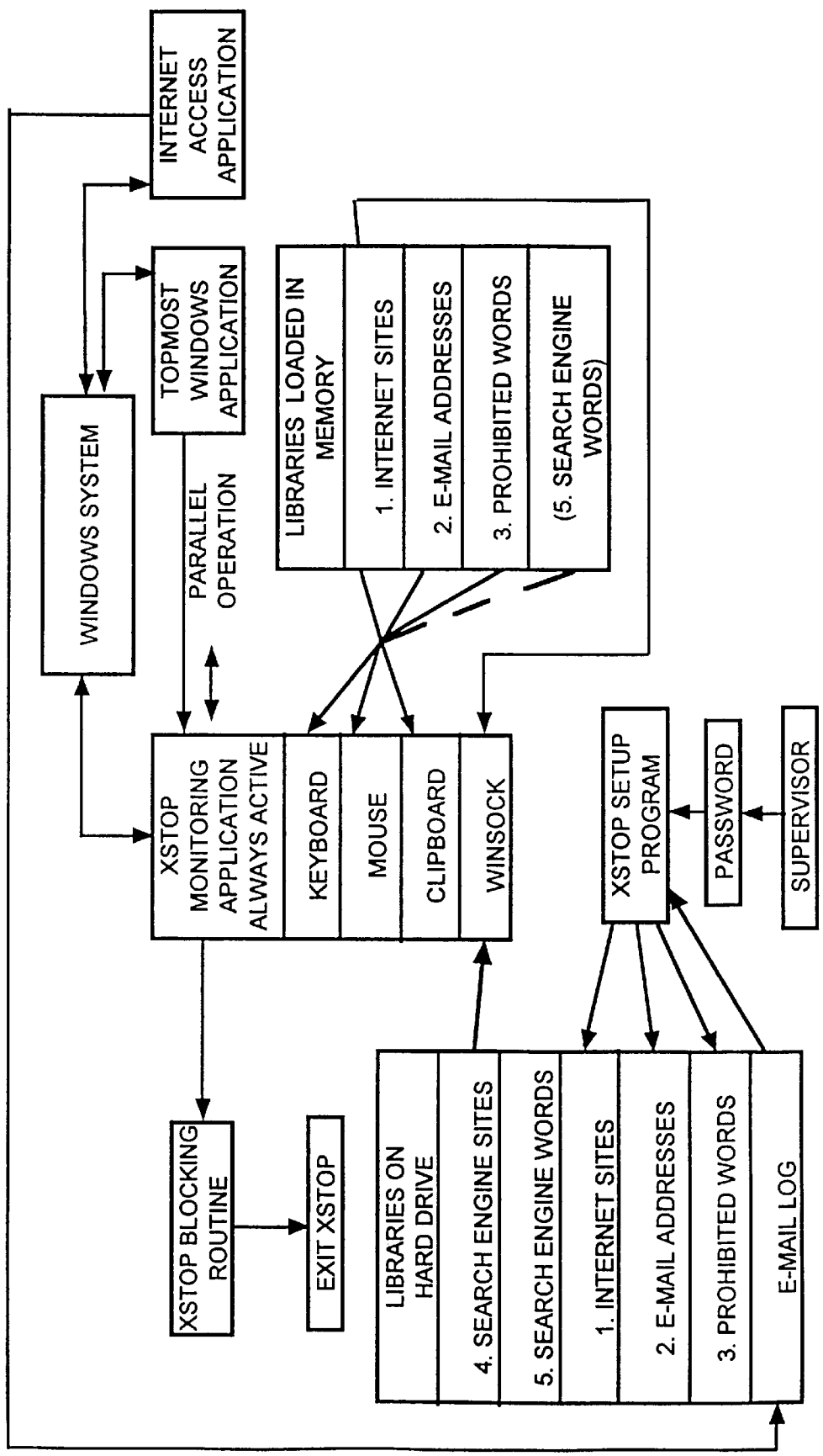
FIG. 2 is a block diagram further illustrating interaction of various components in the invention.

Reference is now made to FIG. 2, which is a block diagram of the X-Stop system running under a Windows 3.1 system, illustrating major components and how they interact with the system and the topmost active application. The X-Stop monitoring application runs always as an active application, usually in the background, under the Windows system. X-Stop runs parallel with any other active application and monitors the active topmost application in the background without interfering with the topmost application, unless the X-Stop blocking routine is activated. The X-Stop monitoring system is divided into four modules, the keyboard sentinel, the mouse sentinel, the clipboard sentinel, and the winsock sentinel, which monitor data being passed into and out of the topmost application and compare the data to that stored in libraries stored in the volatile computer memory. The first of the three libraries contains prohibited Internet sites, in the form of text strings, e.g., "http://www.mukky.com", and as IP addresses, e.g., "192.63.101.22". The second library contains prohibited E-mail addresses, e.g., "slime@mukky.com". The third library contains prohibited words, i.e., profane and vulgar words, racial slurs and epithets, as well as any other words that a supervisor may wish to have intercepted, such as names of games, (doom.exe, sol.exe), names of sensitive or secret files, accounts, phone numbers, and the like.

The X-Stop monitoring system, through either of its four sentinel modules (keyboard, mouse, clipboard, winsock) monitors data being created or being transferred to or from the topmost active application. The data is compared to the appropriate library and if there is a match in a library to the data, the X-Stop blocking routine is activated. If there is not a match, the application is allowed to function without interference. To the user, the function of the X-Stop monitor is completely transparent, and there is no change in the function of the application; that is unless the blocking routine is activated by interception of a prohibited data string. The keyboard, mouse, and clipboard sentinels compare data to Libraries 1, 2 and 3. The winsock sentinel compares data with the prohibited Internet site library (Library 1) and the search engine site library (Library 4 on the hard drive). If the winsock sentinel finds that the terminal is communicating with a search engine it loads Library 5 (containing prohibited words for key word searches) and adds it to Library 3 in volatile memory. The keyboard, mouse, and clipboard sentinels then compare Libraries 1 and 2 and expanded Library 3.

A particularly unique aspect of X-Stop is its handling of search engines. In prior art systems, a user was completely blocked from using search engines, which prohibited their use for finding pornographic Internet sites, but also blocked their use for legitimate research. The X-Stop winsock sentinel detects access to a search engine by comparison of the site address to a fourth library containing a list of search engine sites. While in the search engine, the fifth library is added for data comparison by the sentinel modules. This fifth library contains words which in ordinary usage are not vulgar or pornographic, but when used in a search request can produce a list of pornographic sites. These words include, for example, "nude", "naked", "women", "bare", and "sex".

The blocking routine is designed to prevent any further use of the computer system by a user unless a supervisor intervenes to deactivate X-Stop, preferably by entering a password. The function of the blocking routine is explained in more detail below.

Also stored on the hard drive is an E-mail log that is a log for all in-coming and out-going E-mail passing through the Internet access application. The log is accessible to a supervisor by use of a password for review and monitoring.

The X-Stop system is interactive in several respects. A supervisor may deactivate the system, either before or after activation of the blocking routine, modify the libraries, and change the way the program works.

Libraries on the hard drive are modified and the setup of the program is accomplished by the supervisor by use of a set-up routine in X-Stop. In an actual implementation of the X-Stop set-up, the set-up routine is activated when the program is first installed, and can be run anytime thereafter under Windows when changes are required. When the set-up routine is run from Windows, a password screen is presented on the monitor that allows further access only through keyboard entry of the correct password. In the setup program, the following options are presented on the menu bar; "Review", "Block", "SoapBOX", "Setup", "Help ".

Selecting "Review" presents a pull-down menu with the choices "E-mail" and "Exit". Selecting "E-mail" presents a submenu with the choices, "Mail In" and "Mail Out". Selecting "Mail In" opens the log file of all incoming E-mail. Presented is a list of messages, any of which may be opened for reading, saved to a separate file, or deleted from the list. Selecting "Mail Out" opens the log file of all outgoing E-mail and presents a similar screen to open, save, or delete the messages. The supervisor can at this point note any E-mail addresses for addition to the Library of blocked E-mail addresses.

Selecting "Block" from the main menu bar presents a pull-down menu with the choices "Block Server", "Block E-mail", and "Foul Language". Selection of one of these choices allows modification of Library 1 (Internet Sites), Library 2, (E-mail addresses), and Library 3 (Prohibited Words), respectively. Selecting "Block Server" displays a screen for deleting and adding prohibited Internet sites, including a box for entering or editing a server or Internet address. The screen also includes buttons to add, delete, and buttons to toggle through the list of sites in Library 1. An Internet address may be entered into the editing box by typing or toggling through the list of addresses in the library. A button is also included to exit the editing screen. Upon exit of the screen, a reminder is presented that the changes will only become effective after Windows is restarted. This is because the library which is modified is stored on the hard disk, and it only becomes active when it is read into computer memory upon startup of Windows. Selecting "Block E-mail" and "Foul Language" produces similar screens for modifying Libraries 2 and 3, respectively.

Selecting "SoapBOX" from the main menu bar allows the supervisor to choose one of four prewritten messages and send it through the computer's Internet E-mail application to any of the E-mail sites the supervisor selects from Library 2. The supervisor may also draft his or her own message.

Selecting "Setup" from the main menu bar presents a pull down menu with the choices "Program Setup" and "Vital Files Backup." Selecting "Program Setup" presents a screen with editing boxes for entering and editing the supervisor's or user's name, address, E-mail address, and phone number. There is also a list presented for selecting the E-mail provider for use by the E-mail review program. The password may also be changed from this screen. Preferably, there is also a backup emergency password that can be used if the main password is forgotten, which is entered in this screen.

Selecting "Vital Files Backup" activates a file backup routine that backs up vital files for X-Stop and Windows to a floppy disk. This is part of the system to prevent tampering with the system and to rescue or restore the system after it has been disabled due to tampering. The library files are encrypted and attempts to decrypt or tamper with the program code will result in corruption of some of the files required to run Windows and X-Stop. This corruption will often disable the computer unless the files can be restored. The backup or "rescue" disk created by choosing "Vital Files Backup" or during the installation routine can be used to restore the files to their original state.

The "Help" selection from the main menu bar functions the same as in conventional Windows applications, to give information about X-Stop and to allow reading of any help files that may be supplied.

A tool bar is also presented for selection of the most frequently used functions, e.g., the E-mail review function (E-mail In and E-mail Out), the library modification functions, the "SoapBOX" function, the setup function, help, and exit.

Upon startup of Windows, the X-Stop monitoring routine is loaded into memory and, unless closed will remain active in the background, thus monitoring the activity of any active topmost application. To close the X-Stop monitoring routine, a password must be supplied from the supervisor. Clicking the icon of the X-Stop monitor and selecting "close" will present a screen requesting a password and the X-Stop monitor will only close if the correct password is typed in. Once closed, the X-Stop monitor can only be reactivated by restarting Windows. In addition, Libraries 1, 2 and 3, are read from the hard-disk upon start-up into the volatile computer memory (RAM) to allow reading of the libraries by the sentinel modules without materially slowing down the system. The E-mail review module is also read into computer memory if E-mail tracking of incoming and outgoing E-mail was selected in Setup.

Figure 3:
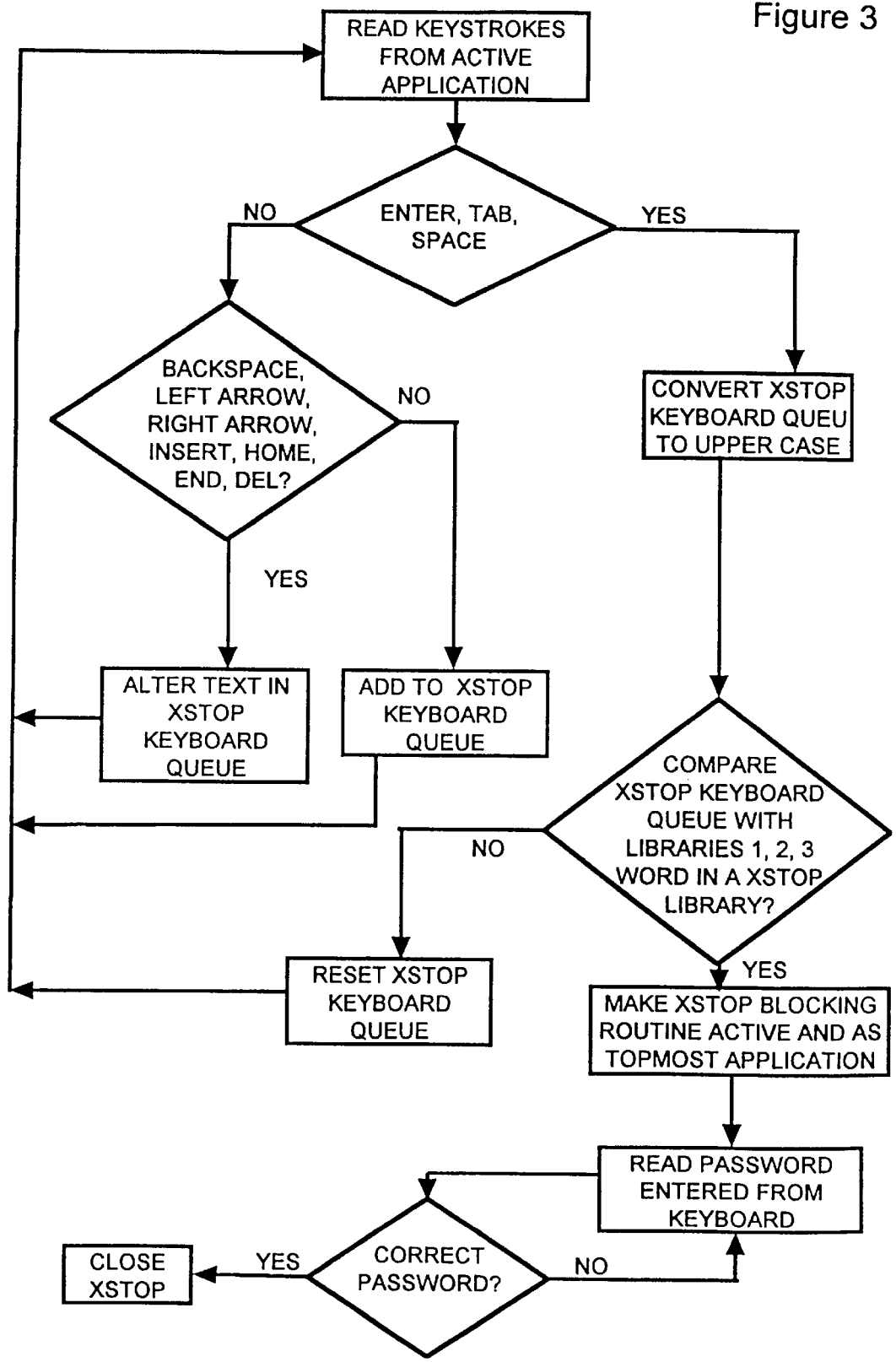
FIG. 3 is a flow sheet illustrating the keyboard sentinel of the invention.

Reference is now made to FIG. 3, which is a flow chart of the keyboard monitor sentinel of the X-Stop monitor system. The keystroke monitor reads keystrokes from the topmost active application. When an application is opened, Windows creates in memory an application keyboard queue for that application. X-Stop likewise creates an application keyboard queue in computer memory. If another application is then opened, or selected, the keyboard queues of both Windows and X-Stop are retained and a new keyboard queue opened. X-Stop creates its keyboard queue in parallel with the application keyboard queue.

The function of the routine for the X-Stop keyboard queue is to isolate individual words as they are typed for comparison with X-Stop libraries. The words are isolated by use of termination and altering characters in the string of characters being typed in. Any routine that functions in this matter is suitable. In the illustrated embodiment, typed characters are added to the queue unless they are altering characters or word-termination characters. When an altering character is typed (backspace, left arrow, right arrow, home, end, del, insert) the text is altered in the X-stop keyboard queue consistent with the altering character that is typed in. A termination character (enter, tab, or space) indicates that an end of a word has been reached. A routine may also be included to ignore or delete superfluous characters such as ",", "!", "!", "!" and the like. When a termination character is entered, X-Stop converts the X-Stop keyboard queue to upper-case, and initiates a comparison of the word, i.e., the character string in the queue, with the data in Libraries 1, 2 and 3. If the word is not found in the libraries, the X-Stop keyboard queue is reset. If a match is found in the libraries, the blocking routine is initiated. X-Stop™ makes the blocking routine active as the topmost application and displays on the monitor a blocking screen overlaying the display and also including a text box for typing in a password. If the correct password is typed in, X-Stop is closed and there is no monitoring of the applications by X-Stop until Windows is restarted. If the incorrect password is typed in, the blocking display on the monitor screen remains.

If a match is not found in the libraries, the keyboard monitor loops back to compare further words typed and edited at the keyboard with the libraries. This is done without disturbing the application and is transparent to the user.

When the system is blocked the blocking routine remains topmost so one cannot close the blocking routine without the correct password. A user that initiates the blocking routine by inappropriate activity has only two choices, (1) to call a supervisor to disable the system with a password or (2) reboot the computer by ctrl+alt+del, reset, or turning the computer off and on. A supervisor can avoid the monitoring of the computer by closing X-Stop. This is accomplished by entering a password when the system is blocked or by closing the X-Stop monitor at any other time by a password.

Other blocking techniques are less desirable, but are contemplated by the invention. It was found that a blocking system that merely prevents use of certain words and use less drastic blocking techniques induce the user to experiment with various words and their forms, trying to find one that isn't blocked. Usually the user will not find a vulgar word that isn't blocked if the library is comprehensive, but an enormous amount of time and computer use is wasted. This can be a particular problem in schools where the user should be using the time for school work. The requirement of calling a supervisor or the requirement of having to lose work and spend the time to restart the computer and wait for the computer to reboot effectively eliminates motivation to experiment. If, through a mistyping, the blocking routine is activated, a supervisor is usually readily available to disable the system and allow the user to save the file. In office settings, applications and office procedures are usually set up to frequently backup files and the availability of supervisors will eliminate most cases of lost work from an inadvertent mistyping of a vulgar word that activates the blocking routine.

Alternate blocking routines may include routines that prevent transmission of prohibited words by deleting them from the keyboard queue, clipboard, etc., without interfering with further operation of the computer, intervening with only a temporary warning screen, or audible warning. The blocking routine may also selectively disable certain selected input/output ports, such as the serial and parallel interfaces (e.g., the modem is disconnected and the document can't be printed.) It may also disable some other function of the computer software or hardware to allow limited operation of the computer so that files may be saved and applications properly closed. The number of violations may be monitored so that the system can initiate a more severe blocking routine after a selected number of violations. In addition, a log may be kept of the number and nature of violations for review by the supervisor. If the routine is designed to prevent any further computer activity it may also include an automatic routine for saving all of the open files running under Windows before the system is fully blocked. The program setup routine may also permit the supervisor to select from a list of blocking methods, select a hierarchy of blocking methods based upon preselected conditions or users, and select file savings, logging, etc.

Figure 4:
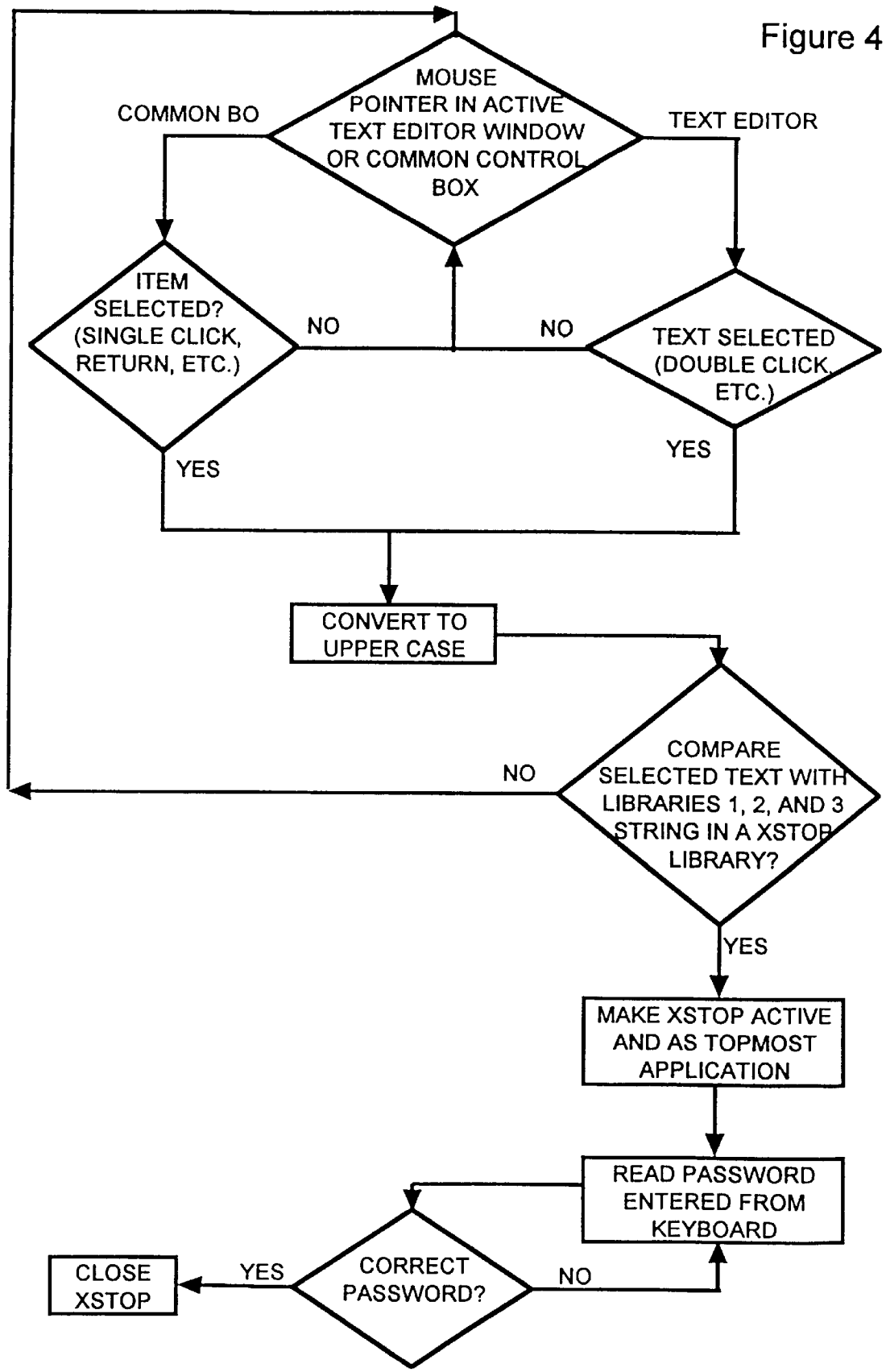
FIG. 4 is a flow sheet illustrating the mouse sentinel of the invention.

Reference is now made to FIG. 4 which is a flow sheet of the mouse sentinel of the X-Stop monitor module. The mouse sentinel determines if there is an active text editing window or a common control box. A text editing window is a window that allows editing of its contents, such as in the main document editing screen of a word processor or text editor; here, text can be selected by double clicking over the word. When text is selected the selected text is converted to upper case and compared with X-Stop libraries. The text is normally selected by double clicking the mouse, but may also be selected by other methods, such as using the shift and arrow keys. A common box is a program item, Internet address, command displayed as an icon in an application group on the Windows desktop, a selection of a "Hypertext" selection on an Internet web page, or as a choice listed in a menu bar, a pull down menu, palette, or the like.

If a user selects a common box by mouse movement and at least a single click of the left button, use of the alt, tab, and enter keys, or any like operation, the command, program name, file name, Internet site, or whatever data string associated with the icon, is converted to upper case and compared with the X-Stop libraries. If a match is found the blocking routine is initiated. If a match is not found the routine continues to loop to monitor subsequent mouse selections. The data string is compared with Libraries 1, 2 and 3, unless the user is in a search engine. In a like matter, text selected in a text editing window is compared.

Figure 5:
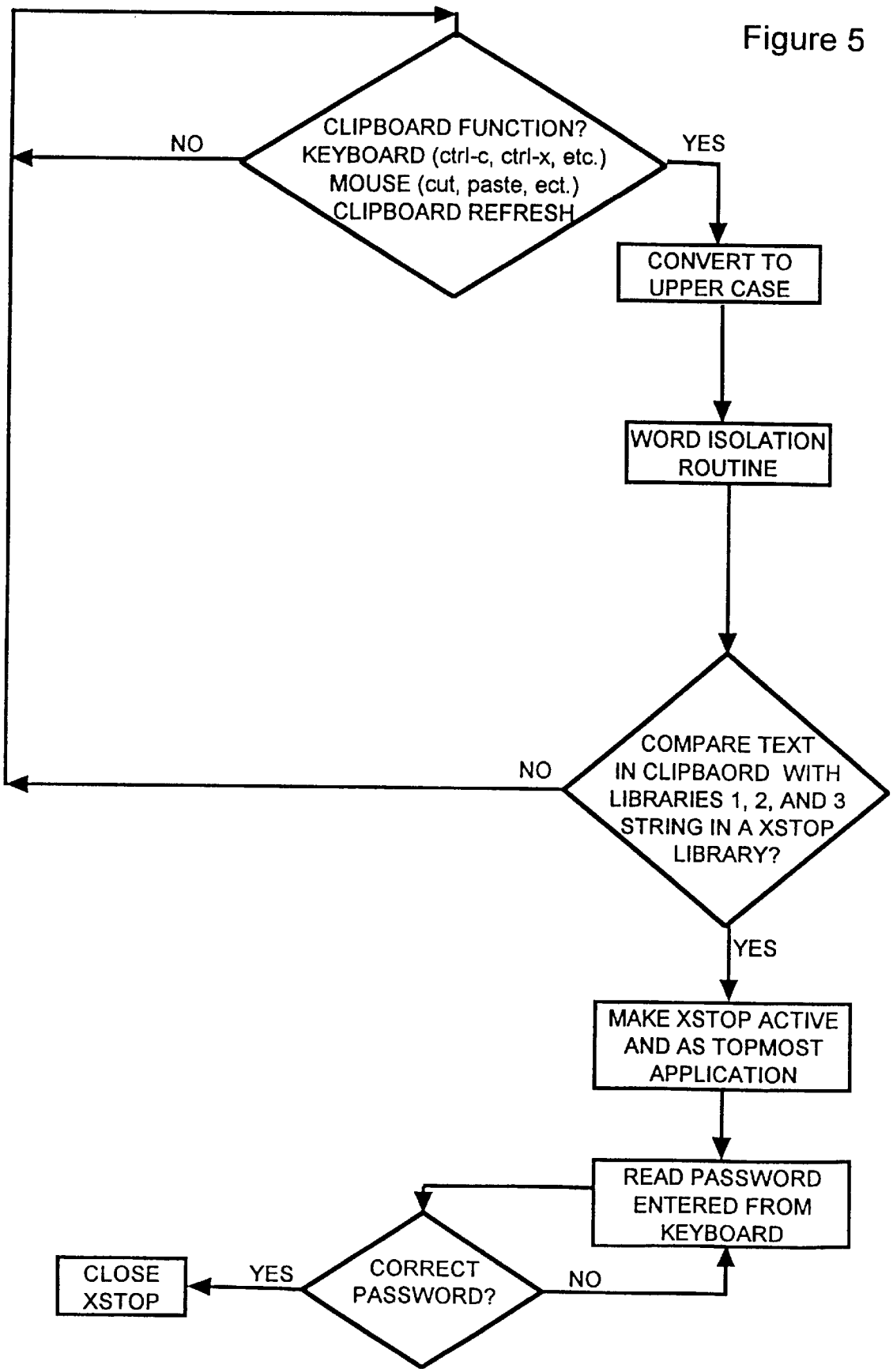
FIG. 5 is a flow sheet illustrating the clipboard sentinel of the invention.

FIG. 5 illustrates the clipboard sentinel of the X-Stop monitor. The clipboard is an application that remains active in the background and is used for transferring blocks of text, etc., within an application or from one application to another. When the clipboard is refreshed (such as opening a file into clipboard) or a clipboard function is selected, e.g., copy, cut, paste, from a menu bar with mouse or keystrokes, or an appropriate keystroke, such as ctrl+c, ctrl+x, ctrl+v, ctrl+insert, shift+insert, etc., the clipboard routine is activated. The contents of the clipboard are converted to uppercase and a word isolation routine is activated. The word isolation routine breaks the text in the clipboard into individual words in a manner similar to that in the keyboard sentinel by detection of word termination characters in the clipboard text. Each word is then compared with Libraries 1, 2 and 3. If a match is found, the blocking routine is activated. If no match is found, the program cycles back to wait for further clipboard activity.

Figure 6A:
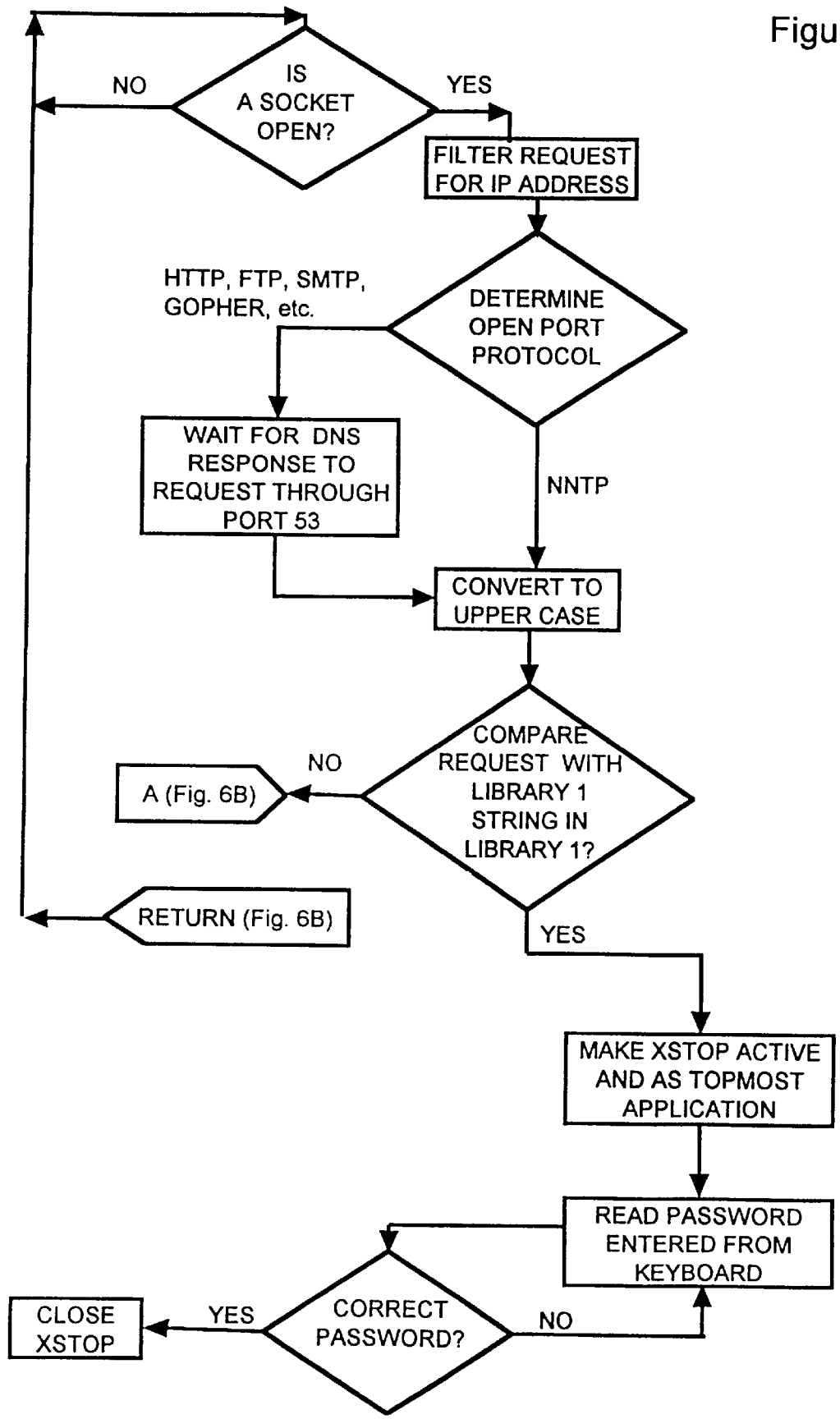
FIGS. 6A and 6B are flow sheets illustrating the winsock sentinel of the invention.
Figure 6B:
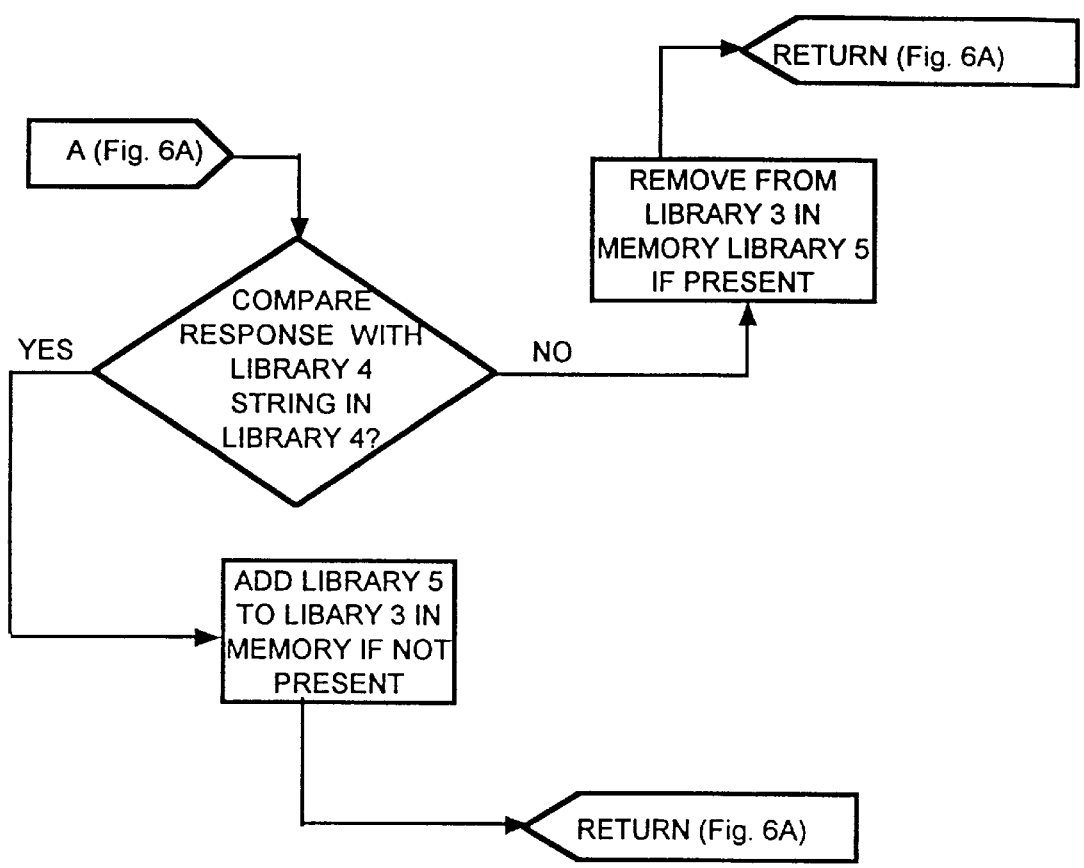

FIGS. 6A and 6B are flow sheets illustrating the winsock sentinel of the X-Stop monitor. In Windows, the winsock is a .dll file that allows applications to communicate with the proper TCP/IP Internet protocols. Other systems, such as the MacIntosh systems have corresponding TCP/IP drivers called MAC.TCP. Winsock is constructed with 32 sockets, which are memory blocks through which data passing to and from the Internet is passed. Data passing through the Internet is in the form of packets which among other things, contain a request for the site to which the data is destined. Referring to FIG. 6A, if a socket is open (data is going out to the Internet), X-Stop examines the data request and filters it for the IP address.

Most Internet sites (http, ftp, etc.) will respond to a request after it receives the data. A response may be different than the request because, for example, the request may have been for a sub-page of a site. If the string requesting the subpage was not in Library 1, there would be no match. However, the IP address in the return is more likely to match if the site is included in prohibited sites. Thus, by comparing the IP address and any response, the possibility of a prohibited site not matching a site in Library 1 is lessened. If no response is received, the program returns to await further activity through the winsock. If the site is a type which does not send a response, e.g., a NNTP news group, the program compares only the request IP address with Library 1.

The address is then converted to uppercase and compared with prohibited Internet addresses in Library 1. If a match is found, the blocking routine is activated. The Internet address sent through winsock is the form of its IP, Internet protocol, which is the form of four numbers, e.g., 192.34.121.112. Therefore, Internet addresses are stored on Library 1 in their IP form and alphanumeric form, e.g., http://www.mukky.com.

A unique feature of X-Stop is its response to search engine sites. The prior art method of handling search engines is to prohibit all access to search engines, which block many legitimate uses of the Internet. Referring also to FIG. 6B, if there is one match after a comparison of the IP in the request and the IP in the response, the IP in the response/request is compared with Library 4 on the hard drive, which contains search engine sites. If no match is found, Library 5 is removed from Library 3 in the volatile memory if it is present, and the program loops to the beginning to monitor further winsock activity. If a match is found, Library 5 is loaded into memory by adding it to Library 3 in volatile memory (unless it is already present), and each of the monitors, i.e., the keyboard sentinel, mouse sentinel, and clipboard sentinel will then compare their respect data strings with all of the libraries in memory, Libraries 1, 2 and combined Libraries 3 and 5. Library 5, as explained above, contains words that are normally safe, but can be used for effective searches of pornographic sites.

EXAMPLES

This section contains exemplary scenarios of how a user may attempt to create, transmit, and receive prohibited material, circumvent the system, and the manner in which the X-Stop system responds.

EXAMPLE 1

The user is in a word processing application and types "mukky". The keyboard sentinel detects the typing of the prohibited word and blocks the system.

EXAMPLE 2

The user sees "mukky" in a document on the computer and tries to insert it into a document on the word processor by copying "mukky" to the clipboard and pasting it into a document. The clipboard sentinel detects the passage of the prohibited word through the clipboard and blocks the system.

EXAMPLE 3

The user tries to find a pornographic site like "http://www.mukky.com" with Lycos. The user then tries to use a key word search with the words, "naked", "bare", and "sex". The keyboard sentinel initiates the blocking routine when these words are typed in through matches in Library 5, which was activated by the winsock sentinel.

EXAMPLE 4

User hears about "http://www.mukky.com" through E-mail from a friend who has a computer terminal without the present invention. Supervisor sees the message when reviewing incoming E-mail, adds "http://www.mukky.com" to Library 1, adds friends E-mail address to Library 2, and sends friend an E-mail message. Therefore, the access to the Internet site is blocked, E-mail to the friends address is blocked, and the friend notified of the action.

EXAMPLE 5

Person at Internet address, "slime@mukky.com" sends invitation via E-mail to subscribe to a mailing list of pornographic stories via E-mail. User sends subscription request. Supervisor, reviewing incoming and outgoing E-mail, sees invitation and request and blocks further outgoing transmission by adding address to Library 2. Therefore, sends a message canceling the subscription and opining on the nature of the business.

EXAMPLE 6

User is bored with homework and wishes to spend the entire afternoon playing Doom™. The user clicks the Doom™ icon. The mouse sentinel initiates the block routine when it finds a match to "doom.exe" in Library 3.

EXAMPLE 7

The user in Example 6 tries to run doom.exe from the file manager or from FILE/RUN in the program manager. The mouse sentinel initiates the block routine when it finds a match to "doom.exe" in library 3.

In prior-art systems, the user activity in Examples 1, 2, 6 and 7 would not have been blocked. Example 3 does not even apply since use of search engines in prohibited in prior-art systems. Examples 4 and 5 would have not been blocked and would have been undetectable by a supervisor unless the actual E-mail transmission is witnessed. Thus, it can be seen how the present invention is much more effective and flexible in monitoring and screening for undesired activity.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein. For example an X-Stop application could be provided without all of the four sentinels. For example, an embodiment with the keyboard, mouse, and winsock would effectively block undesired activity of the majority of users, as many do not fully understand the use of the clipboard in transferring text. In addition, if a terminal is used with a non-TCP/IP local network with no Internet access or with a non-TCP/IP Internet provider, such as America-On-Line™, the winsock sentinel may be deleted. In addition, custom Libraries may be provided for security or business applications for a particular business. Blocking routines may be made less punitive, and different blocking routines may be provided for different users or for different sentinels. In addition, the sentinels may be expanded to compare more content such as comparing the individual words in the text of incoming and outgoing E-mail with the libraries. These extensions of the sentinel function may not be practical given the speed of currently used computer systems, but may be practical for commercial work stations, or future home systems.

What is claimed and desired to be secured by Letters Patent is:

1. A computer terminal for blocking selected data transmissions and data creations comprising:

a central processing unit in communication with a keyboard, a mouse pointer, a volatile memory with at least a part thereof being used as a clipboard, a network interface, a display monitor, and a non-volatile memory;

at least one database of preselected data strings stored in the non-volatile memory;

a keyboard monitor comprising a comparator for comparing a typed data string with the preselected data strings when the typed data string is generated on the keyboard;

a mouse monitor comprising a comparator for comparing mouse data strings with the preselected data strings when the mouse data strings are selected by the mouse pointer;

a clipboard monitor comprising a comparator for comparing clipboard data strings in the form of contents of the clipboard with the preselected data strings when the contents of the clipboard are changed;

network monitor comprising a comparator for comparing a network data string of data passing through the network interface with the preselected data strings;

a blocker comprising a transmission disabler for preventing transmission or creation of data strings, a display for displaying on the display monitor a blocking screen, and a disabler for disabling the blocking screen based upon a preselected condition; and an activator for activating the blocking screen when one of the keyboard, mouse, clipboard and network monitors identifies a match between the data string it is comparing and one of the preselected data strings in the at least one database.

2. A computer terminal as in claim 1 wherein the volatile memory comprises a RAM and the non-volatile memory comprises a hard drive.

3. A computer terminal as in claim 1, wherein the at least one database comprises one or more databases selected from a database of network sites to which access is to be blocked, a database of E-mail address to which E-mail transmissions are to be blocked, and a database of words of which creation or transmission are to be blocked.

4. A computer terminal as in claim 1, wherein the keyboard monitor comprises a keyboard queue separate from application keyboard queues and a processor for processing the keyboard queue to generate a data string in the form in the form of a single word for comparison with the preselected data strings.

5. A computer terminal as in claim 1, wherein the mouse monitor comprises a comparator for comparing the mouse data strings selected from a common box and for comparing text selected from a text editing window.

6. A computer terminal as in claim 1, wherein the clipboard monitor compares clipboard data strings with the preselected data strings whenever data is copied from or copied to the clipboard.

7. A computer terminal as in claim 1, wherein the network interface comprises an information transfer protocol interface and the network monitor comprises a filter for filtering an IP address from a request and an IP address from a response.

8. A computer terminal as in claim 1 wherein the network interface comprises an information transfer interface and the at least one database contains Internet addresses.

9. A computer terminal as in claim 1, wherein the preselected condition for the disabler of the blocker comprises the entry of a password by a supervisor and the blocker comprises a prohibitor for preventing further entry of any data from the keyboard, the mouse, or network interface, except the password from the supervisor, through the keyboard.

10. A computer terminal as in claim 9, wherein the display comprises an image replacer for replacing a major portion of the image on the display monitor with the blocking screen, and a display for displaying a text entry of the password on the blocking screen.

11. A computer terminal as in claim 1, additionally comprising a subtractor and adder for deleting data strings from and for adding data strings to the at least one database.

12. A computer terminal as in claim 11, wherein the subtractor and adder comprises a blocker to block access to the addition or deletion of data strings unless a predetermined condition is met.

13. A computer terminal as in claim 12 wherein the predetermined condition comprises the entry of a password upon initialization of the adder and subtractor.

14. A computer terminal as in claim 1, additionally comprising a copier to copy the at least one database from the non-volatile memory to the volatile memory and at least one of the comparators comprise a reader for reading the database in the volatile memory for comparison with the preselected data strings.

15. A computer terminal as in claim 1 wherein the at least one database comprises data strings related to pornography and foul language.

16. A computer terminal as in claim 1 wherein the at least one database comprises data strings related to confidential files.

17. A computer terminal as in claim 1 wherein the at least one database comprises data strings related to game programs.

18. A computer terminal as in claim 1 wherein the at least one database comprises data strings related to confidential information to be prevented from leaving the computer terminal.

19. A computer terminal as in claim 1, additionally comprising a list of keyword data strings in the non-volatile memory for adding said keyword data strings to the at least one database, the keyword data strings comprising words to be blocked in a key word search environment.

20. A computer terminal as in claim 19, additionally comprising a list of network search engine sites, an additional reader for reading said database, a comparator for comparing the list of network search engine sites with an IP address passing through the network interface and an additional activator for adding the keyword data strings to the at least one database when a match between an and the IP address occurs.

21. A computer terminal as in claim 1, additionally comprising a writer for writing to a log file on the non-volatile memory a copy of in-coming E-mail passing through the network interface and accessing the log file only after a predetermined condition is met.

22. A terminal as in claim 21 wherein the log file is accessible only after a password is entered at the keyboard.

23. A computer terminal for blocking selected data transmissions and data creations comprising:

a central processing unit in communication with a keyboard, a mouse pointer, volatile memory with at least a part thereof being used as a clipboard, a network interface, a display monitor, and a non-volatile memory;

a keyboard monitor comprising a comparator for comparing a typed data string with the preselected data strings when the typed data string is generated on the keyboard;

a blocker comprising a transmission disabler for preventing transmission or creation of data strings, a display for displaying on the display monitor a blocking screen, and a disabler for disabling the blocking screen based upon a preselected condition; and an activator for activating the blocking screen when the keyboard monitor identifies a match between the typed data string and one of the preselected data strings in the at least one database.

24. A computer terminal for blocking selected data transmissions and data creations, comprising:

a central processing unit in communication with a keyboard, a mouse pointer, volatile memory with at least a part thereof being used as a clipboard, a network interface, a display monitor, and a non-volatile memory;

at least one database of preselected data strings stored in the non-volatile memory;

a keyboard monitor comprising a comparator for comparing a typed data string with the preselected data strings when the typed data string is typed;

a mouse monitor comprising a comparator for comparing mouse data strings with the preselected data strings when the time the mouse data strings are selected by the mouse pointer;

a blocker comprising a transmission disabler for preventing transmission or creation of data strings, a display for displaying on the display monitor a blocking screen, and a disabler for disabling the blocking screen based upon a preselected condition; and an activator for activating a blocking screen when either of the keyboard and mouse monitors identifies a match between the data string it is comparing and one of the preselected data strings in the at least one database.

25. A computer terminal for blocking selected data transmissions and data creations comprising:

a central processing unit in communication with a keyboard, a mouse pointer, volatile memory with at least a part thereof being used as a clipboard, a network interface, a display monitor, and a non-volatile memory;

at least one database of preselected data strings stored in the non-volatile memory;

a keyboard monitor comprising a comparator for comparing a typed data string with the preselected data strings when the typed data string is typed into the keyboard;

a mouse monitor comprising a comparator for comparing mouse data strings with the preselected data strings when the mouse data strings are selected by the mouse pointer;

a network monitor comprising a comparator for comparing a network data string in the form of an IP address of data passing through the network interface with the preselected data strings;

a blocker comprising a transmission disabler for preventing transmission or creation of data strings, a display for displaying on the display monitor a blocking screen, and a disabler for disabling the blocking screen based upon a preselected condition; and an activator for activating the blocking screen when one of the keyboard, mouse and network monitors identifies a match between the data string it is comparing and one of the preselected data strings in the at least one database.

26. A computer terminal for blocking selected data transmissions and data creations comprising:

a central processing unit in communication with a keyboard, a mouse pointer, a volatile memory a network interface, a display monitor, and a non-volatile memory;

at least one database of preselected data strings stored in the non-volatile memory;

a keyboard monitor comprising a comparator for comparing a typed data string typed into the keyboard with the preselected data strings, wherein the comparing is performed independently of transmission of the typed data string through the network interface;

a network monitor comprising a comparator for comparing a network data string in the form of an IP address of data passing through the network interface with the preselected data strings;

a blocker comprising a transmission disabler for preventing transmission or creation of data stings, a display for displaying on the display monitor a blocking screen, and a disabler for disabling the blocking screen based upon a preselected condition; and an activator for activating the blocking screen when one of the keyboard and network monitors identifies a match between the data string it is comparing and one of the preselected datastrings in the at least one database.

27. A computer terminal for blocking selected data transmissions and data, creations comprising:

a central processing unit in communication with a keyboard, a mouse pointer, a volatile memory with at least a part thereof being used as a clipboard, a network interface, a display monitor, and a non-volatile memory;

at least one database of preselected data strings stored in the non-volatile memory;

a keyboard monitor comprising a comparator for comparing a typed data string typed into the keyboard with the preselected data strings, wherein the comparing is performed independently of transmission of the typed data string through the network interface;

a mouse monitor comprising a comparator for comparing mouse data strings selected by the mouse pointer with the preselected data strings, wherein the comparing is performed independently of transmission of the mouse data string through the network interface;

a clipboard monitor comprising a comparator for comparing a clipboard data string in the form of contents of the clipboard with the preselected data strings, wherein the comparing is performed independently of transmission of the clipboard data string through the network interface;

a blocker comprising a transmission disabler for preventing transmission or creation of data strings, a display for displaying on the display monitor a blocking screen, and a disabler for disabling the blocking means based upon a preselected condition; and an activator for activating the blocking screen when one of the keyboard, mouse and clipboard monitors identifies a match between the data string it is comparing and one of the preselected data strings in the at least one database.

28. A computer terminal for blocking selected data transmissions and data creations, comprising:

a central processing unit in communication with a keyboard, a mouse pointer, a volatile memory with at least a part thereof being used as a clipboard, a network interface, a display monitor, and a non-volatile memory;

at least one database of preselected data strings stored in the non-volatile memory;

a plurality of monitors selected from the list consisting of:
a keyboard monitor comprising a comparator for comparing a typed data string typed into the keyboard with the preselected data strings, wherein the comparing is performed independently of transmission of the typed data string through the network interface;
a mouse monitor comprising a comparator for comparing mouse data strings selected by the mouse pointer with the preselected data strings, wherein the comparing is performed independently of transmission of the mouse data string through the network interface;

a clipboard monitor comprising a comparator for comparing a clipboard data string in the form of contents of the clipboard with the preselected data strings, wherein the comparing is performed independently of transmission of the typed clipboard data string through the network interface;

a network monitor comprising a comparator for comparing a network data string in the form of an IP address of data passing through the network interface with the preselected data strings;

a blocker comprising a transmission disabler for preventing transmission or creation of data strings, a display for displaying on the display monitor a blocking screen, and a disabler for disabling the blocking screen based upon a preselected condition; and an activator for activating the blocking screen when any of the monitors identifies a match between the data string it is comparing and one of the preselected data strings in the at least one database.

29. A computer running under a multi-tasking environment, comprising a blocker that selectively blocks data transmissions within the computer when at least one condition established by a predetermined criteria is met, the selective blocker comprising:

at least one file comprising data strings which are directly related to the criteria;

a plurality of comparators which compare data generated by I/O devices resident in the terminal against the data strings at the time the data is generated by the I/O devices;

a blocker comprising a transmission disabler to disable transmissions upon a match of the data from the I/O devices and the data strings by any of the comparators; and a supervision control comprising an adaptor for changing the content of the at least one file to change the criteria.

30. The computer of claim 29 wherein the blocker comprises a report compiling routine and the supervision control comprises a display/printer for displaying and printing the report.

31. The computer of claim 29, wherein the blocker comprises a master disabler for preventing operation of the computer except for entering a predetermined password or resetting the computer.

32. The computer of claim 29 wherein the blocker comprises a conditional continuation disabler which blocks transmission, but permits continued operation of the computer for a predetermined number of times before halting operation of the computer.

33. A method for preventing a computer in a multi-tasking environment from generating preselected text in a topmost active application and from transmitting preselected text to or from a topmost active application:

in the background of at least one active application, conducting a plurality of functions from the list consisting of:

(1) monitoring a keyboard queue of the topmost application to build a new queue of each word as the word is typed in and comparing each word as the word is generated in the queue with a list of text strings in at least one database;

(2) monitoring a mouse and comparing each data string as the data string is selected by the mouse with the list of text strings in the at least one database;

(3) monitoring a clipboard and comparing the contents of the clipboard when data is copied into or out of the clipboard with the list of text strings in the at least one database;

(4) monitoring network interface and comparing a destination address of data traveling through the interface with the list of text strings in the at least one database; and at least temporarily disabling further operation of the computer when a match is found from any of the comparisons.

34. A method as in claim 33, wherein the at least one database is stored in a non-volatile memory and is read from the non-volatile memory to a volatile memory.

35. A method as in claim 33, wherein at least one database is stored in a RAM and is read from a hard drive.

36. A method as in claim 33, wherein the the list of text strings comprises network sites to which access is to be blocked, E-mail addresses to which E-mail transmissions are to be blocked, and words of which creation or transmission are to be blocked with the preselected text.

37. A method as in claim 33, wherein monitoring the keyboard queue step comprises processing the keyboard queue to generate a data string in form of a single word for comparison with the list of text strings in the at least one database.

38. A method as in claim 33, wherein the mouse monitoring step comprises comparing data strings selected from a common box and comparing text selected from a text editing window.

39. A method as in claim 33, wherein the clipboard monitoring step comprises comparing a data string in the form of text in the clipboard whenever data is copied from or copied to the clipboard.

40. A method as in claim 33, wherein the network interface monitoring step comprises monitoring an information transfer protocol interface so as to filter an IP address passing through the interface.

41. A method as in claim 33, wherein the disabling step comprises displaying an image on a blocking screen and disabling the computer when a preselected condition is met.

42. A method as in claim 41, wherein the disabling step prevents further entry of any data from the keyboard, the mouse or network interface, except entering a password.

43. A method as in claim 42, wherein displaying an image on a blocking screen comprises replacing a major portion of the image on a blocking screen, and displaying on the blocking screen a text entry box for entry of the password.

44. A method as in claim 33, additionally comprising the steps of deleting data strings from and adding data strings to the at least one database.

45. A method as in claim 44, wherein deleting and adding data strings is blocked unless a predetermined condition is met.

46. A method as in claim 44, further comprising the step of entering a password prior to deleting and adding data strings.

47. A method as in claim 33, additionally comprising the step of copying the at least one database from a non-volatile memory to a volatile memory.

48. A method as in claim 33, the list of text strings is related to pornography and foul language.

49. A method as in claim 33, further comprising the step of blocking further operation of the computer when the preselected text is related to confidential files and the at least one database comprises data strings related to confidential files.

50. A method as in claim 33, wherein the list of text strings is related to game programs.

51. A method as in claim 33, wherein the list of text strings is related to confidential information that should not leave the computer terminal.

52. A method as in claim 33, further comprising the step of reading additional data strings from a second database in a non-volatile memory and adding said additional data strings to the at least one database, the additional data strings comprising words to be blocked in a key word search environment.

53. A method as in claim 52, additionally comprising reading a list of network search engine sites and matching a search engine site with an IP address prior to adding the additional data strings to the at least one database.

54. A method as in claim 33, additionally comprising of writing to a log file on a non-volatile memory a copy of in-coming E-mail passing through the network interface and accessing the log file after a predetermined condition is met.

55. A method as in claim 54, wherein the predetermined condition is entry of a password.

* * * * *